United States Patent
Goldbach et al.

[15] 3,684,760
[45] Aug. 15, 1972

[54] MOLDING COMPOSITIONS OF POLYBUTENE-1

[72] Inventors: Gunther Goldbach; Heinz-Hermann Meyer, Marl, both of Germany

[73] Assignee: Chemische Werke Huls Aktiengesellschaft, Marl, Germany

[22] Filed: July 27, 1970

[21] Appl. No.: 58,582

[30] Foreign Application Priority Data

July 31, 1969    Germany..........P 19 38 913.0

[52] U.S. Cl. ....260/31.2 R, 260/28.5 A, 260/30.6 R, 260/31.4 R, 260/31.8 PQ, 260/33.6 PQ, 260/33.8 UA
[51] Int. Cl. .......C08f 45/36, C08f 45/52, C08f 45/28
[58] Field of Search ..........260/31.2 R, 897 A, 45.85

[56] References Cited

UNITED STATES PATENTS

| | | | |
|---|---|---|---|
| 3,523,916 | 8/1970 | Needham | 260/897 A |
| 3,320,334 | 5/1967 | Bonvicini | 260/31.2 |
| 3,440,208 | 4/1969 | Foglia | 260/897 A |
| 3,112,160 | 11/1963 | Rush | 260/897 A |
| 3,275,597 | 9/1966 | Mauz | 260/45.85 |
| 3,324,060 | 6/1967 | Scopp | 260/31.2 |
| 2,967,164 | 1/1961 | Aries | 260/31.2 |
| 3,345,447 | 10/1967 | Grant | 260/31.2 |

OTHER PUBLICATIONS

Boor & Mitchell, J. Pol. Sci, 62, S70–73 1962

*Primary Examiner*—Allan Lieberman
*Assistant Examiner*—Paul R. Michl
*Attorney*—Millen, Raptes & White

[57] ABSTRACT

The conversion of polybutene-1 from modification II to modification I is accelerated by the incorporation therein of a mixture of a solid polypropylene and a low molecular weight compound, e.g., oil, wax, an oily or semi-liquid polyolefin, a higher aliphatic carboxylic acid or salt or ester thereof, an ester of an aromatic carboxylic acid, an ester of an inorganic acid or a chlorinated paraffin.

10 Claims, 1 Drawing Figure

A  POLYBUTENE –1  WITHOUT ADDITIVE
B  POLYBUTENE –1  +10 % BY WEIGHT POLYPROPYLENE
C  POLYBUTENE –1  +5% BY WEIGHT BUTYLSTEARATE
D  POLYBUTENE –1  { +10% BY WEIGHT POLYPROPYLENE AND +5% BY WEIGHT BUTYLSTEARATE }

$t_{1/2} =$  A 2900 min.   C 800 min.
             B 900 min.    D 230 min.

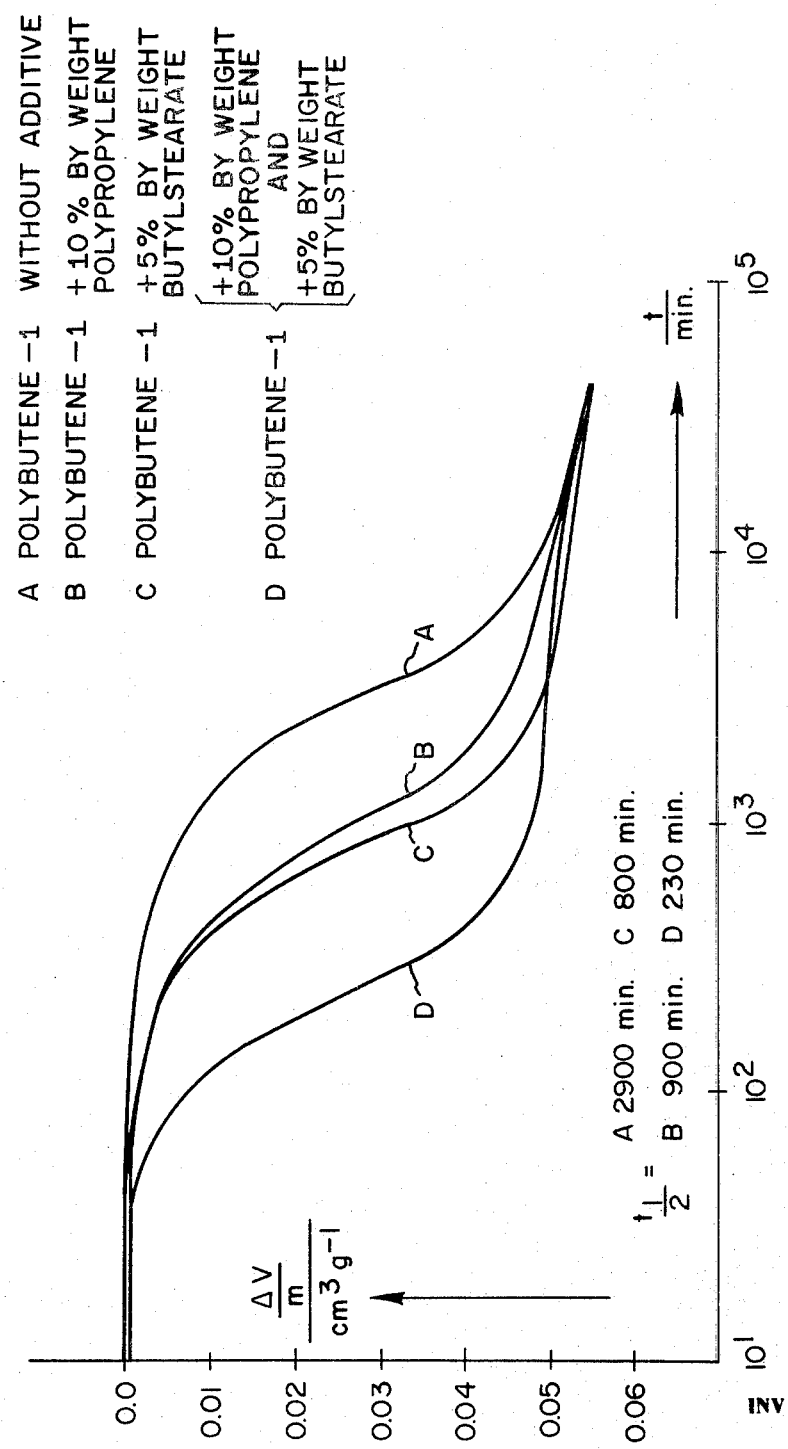

MOLDING COMPOSITIONS OF POLYBUTENE-1

BACKGROUND OF THE INVENTION

This invention relates to improved thermoplastic molding compositions of polybutene-1 containing polypropylene.

As is known, polybutene-1 exhibits four different crystalline modifications (J. Appl. Phys. 35, 3241 [1964]). From the melt, i.e., after granulation and, in particular, after thermoplastic processing, the unstable modification II is first formed, which is rearranged into the stable modification I at room temperature, in the absence of mechanical stresses, normally within about 5–7 days. The tetragonal modification II of polybutene-1 exhibits poor mechanical properties and, for example, has a yield point of only 30–40 kp/cm$^2$ compared to the yield point of more than 200 kp/cm$^2$ of the hexagonal, stable modification I.

Because of the poor mechanical properties of modification II, large-sized shaped articles obtained from polybutene-1 by thermoplastic processing cannot be subjected to mechanical stress in the initial period after their formation. In fact, they cannot even be stored, transported, or further processed without misgivings.

It was found that the speed of conversion of polybutene-1 from modification II to I can be increased by the addition of, for example, stearic acid or isotactic polypropylene thereto (J. Pol. Sci. 62, 70). Likewise, it is known that amyl acetate has an accelerating effect (J. Appl. Phys., loc. cit.). Although some substances had an accelerating effect, others, such as α-chloronaphthalene and diphenyl ether, had no effect at all. Others, such as glycerin or carbon black, had a decelerating effect on the conversion process (J. Pol. Sci. A3, 3803 [1965]).

By means of the above-mentioned additives having an accelerating effect, the rate of conversion of modification II to modification I could be increased to approximately 2 to 3 times that of the corresponding additive-free sample. In general, the conversion speed increases with the amount of additive added to the polybutene-1. However, it is undesirable per se to add foreign substances to polybutene-1, because such substances, in most cases, do not have a beneficial effect upon the properties of the polymer. Therefore, it has been the objective to make available highly effective substances permitting and yet bring about a rapid conversion of modification II to modification I at low concentrations.

OBJECTS OF THE INVENTION

It is an object to provide a novel method for accelerating the conversion of polybutene-1 from modification II to modification I. It is another object to provide such a method employing lesser amounts of additive than heretofore required. It is a further object to provide novel polybutene-1 compositions which rapidly convert after thermoplastic processing from modification II to modification I. Other objects will be apparent to those skilled in the art to which this invention pertains.

SUMMARY OF THE INVENTION

According to this invention, polybutene-1 molding compositions which contain a mixture of 0.1 – 70 percent by weight of polypropylene and 0.1 – 50 percent by weight of a low-molecular compound as defined herein, based on the polybutene-1, have rapid conversion rates from modification II to modification I after thermoplastic processing.

DETAILED DISCUSSION

The polybutene-1 of the compositions of this invention is crystalline thermoplastic polybutene, e.g., those produced by the polymerization of butene-1 with catalysts of the Ziegler-Natta type, whose tacticity is high enough that it can crystallize.

For a description of crystalline polybutene-1 and its production, see, e.g., Kirk-Othmer, "Encyclopedia of Chemical Technology," 2nd Ed., Vol. 3 (1964), under the section "Butylene," pages 830–865, and particularly pages 832 and 846 through 855; Netherlands Pat. No. 6,515,513 of Aug. 4, 1966; G. Natta et al., "Stereospecific Polymerization Mechanism of α-olefins to Isotactic Polymers in the Presence of a Bi-Metallic Catalyst System," Chim. Ind. (Milan), Vol. 48 (12), pages 1298–1306 (1966); "Kunststoffe," Vol. 55, pages 431–437 and 822–827 (1965); and "Chemie-Ingenieur-Technik," Vol. 33, pages 1063–1076 (1966).

The polypropylene of the compositions of this invention can be of any solid polypropylene, both atactic and isotactic, of any desired molecular weight high enough to provide a solid polymer, e.g., from about $5.10^3$ to $10^7$, preferably $10^4$ to $10^6$. Commercially available extrusion grade polypropylene powder can be used.

The thermoplastic polypropylene is employed in amounts, based on the polybutene-1, of 0.1 to 70 percent by weight, preferably about 0.1 to 20 percent by weight, more preferably about 1 to 10 percent.

In addition to the solid polypropylene present in the polybutene-1 compositions of this invention, there is present therein a low molecular weight compound, i.e., one having a molecular weight substantially lower than the polybutene-1 and the solid polypropylene, e.g., from 100 to $5.10^3$, preferably 100 to $3.10^3$.

Among the low molecular weight compounds which can be employed are those which are conventionally employed as plasticizers for vinyl polymers, e.g., polyvinyl chloride, e.g., methyl abietate and hydrogenated methyl abietate; alkyl diesters of adipic acid, e.g., wherein the alkyl group contains from four to 10 carbon atoms; alkyl diesters of azelaic acid, e.g., wherein the alkyl group contains from six to eight carbon atoms; chlorinated biphenyl and chlorinated polyphenyl; alkyl triesters of citric acid and acetylated citric acid; epoxy plasticizers; alkyl diesters of fumaric acid; triethylene glycol and polyethylene glycol 2-ethylbutyrate, 2-ethylhexoate and dicaprylate esters; butyl, propylene glycol, ethylene glycol monoethyl ether and polyethylene glycol esters of lauric acid; trioctyl, triisooctyl mixed octyl decyl, tri-2-ethylhexyl and triisooctyl mellitates; alkyl oleates; chlorinated paraffins; diethylene glycol and triethylene glycol pelargonate; tri-2-ethylhexyl, triphenyl, tricresyl, tri-dimethylphenyl and cresyl diphenyl phosphate; dibutyl, diisobutyl, diamyl, dihexyl, butyl octyl, butyl isodecyl, butylisohexyl, dioctyl, diisooctyl, dicapryl, dinonyl, octyl decyl, didecyl di-tridecyl, ethylhexyl decyl, butyl cyclohexyl di-methylcyclohexyl and diphenyl phthalate; dibutyl, dioctyl and diisooctyl sebacate; alkyl and hydroxyalkyl stearates. For other specific examples, see "Plasticizers Chart," Modern Plastic Encyclopedia (1964) and subsequent editions.

Suitable low-molecular compounds are the mineral oils, e.g., paraffin oil, technical white oil, transformer oil, engine oil, diesel oil and fuel oil; the natural animal, vegetable and hydrocarbon waxes, e.g., carnauba wax, montan wax, and hard paraffins; the low-molecular waxy an oily polyolefins, e.g., polyethylenes having a molecular weight of 300 to 4,000 polypropylenes of a molecular weight substantially lower than the solid polypropylene present in the polybutene-1, e.g., liquid polypropylenes of a molecular weight from about 300 to 3,000; the higher aliphatic carboxylic acids, preferably those containing one to 30, more preferably three to 20 carbon atoms, e.g., stearic acid and palmitic acid, and the salts thereof, e.g., alkali metal and alkaline earth salts, e.g., Na and Ca salts, and esters thereof, e.g., monoesters thereof with monohydric and polyhydric alcohols, esters of aromatic carboxylic acids, especially alkyl esters thereof, e.g., dioctyl phthalate, and esters of inorganic acids, especially aryl esters, e.g., tricresyl phosphate.

Preferred are the alkyl, e.g., containing up to 15 carbon atoms, and hydroxyalkyl, e.g., $\beta$-hydroxyethyl, esters of stearic acid, adipic acid and phthalic acid, and aryl esters of phosphoric acid, e.g., tricresyl phosphate, especially those esters conventionally employed as plasticizers for vinyl polymers.

The low-molecular compound is employed in amounts of 0.1 to 50 percent, preferably 0.5 to 20 percent, especially 1 to 10 percent by weight based on the polybutene-1.

The total proportion of both additives which is added, is about 0.2 to about 70 percent by weight, preferably about 1.5 to 15 percent by weight, based on the polybutene-1.

The polypropylene and the low-molecular compound can be employed in a weight ratio with respect to each other of 0.01–100:, preferably 0.5–10:1, especially 1–3:1.

Both additives can be mixed with the polybutene-1 separately or simultaneously, for example, during granulating step. However, the polypropylene and the corresponding amount of low-molecular compound can first be blended together prior to mixing with the polybutene-1, for example, by sintering in a heated internal mixer, and this mixture is then admixed with the polybutene, for example during granulation.

The advantages obtained by this invention are a rapid acceleration of the rearrangement of the crystal structure of polybutene-1 from the unstable modification II into the stable modification I. Whereas the half-time value of the rearrangement of pure polybutene-1 from modification II into modification I is approximately 50 hours at room temperature and atmospheric pressure, without the effect of additional external compressive or tensile stresses, this half-time value, in the compositions of this invention, is only about 2–13 hours, depending on the concentration and type of the additives. Consequently, the polybutene-1 provided with the additives of this invention can be employed advantageously in all types of injection molding and extrusion applications, e.g., in the production of pipes which exhibit, in a few hours after extrusion, the maximum physical and technical values of modification I, e.g., modulus, tensile strength, and dimensional stability.

It was surprisingly found that it is possible to reach substantially higher conversion rates, compared with those obtained with additives employed in the prior art, by adding instead of a single component, for example, polypropylene or a low-molecular compound respectively by itself, but rather employing the combination thereof. By the combined use of polypropylene and a low-molecular compound as defined herein, a synergistic effect is attained leading to conversion speeds not heretofore attained. Surprisingly, this synergistic effect is obtained even when the low-molecular compound by itself has no effect, or even a decelerating effect, on the modification conversion rate.

The II $\rightarrow$ I modification conversion rate can be determined as follows:

Between the modifications II and I of low-pressure polybutene-1, there is a difference in density of about 0.05 g./cm$^3$, so that the chronological dependency of the conversion II $\rightarrow$ I can readily be observed by dilatometry. The basis for measuring the dilatometrically determined conversion rate is the half-time of conversion $t_{1/2}$ which latter is defined so that, in each case, the value set forth below is attained:

$$\frac{V_{II}(t=15') - V_I(t=10,000')}{2}$$

$V_{II}(t=15')$ is the specific volume 15 minutes after the rapid cooling of the polybutene melt from 180° C. to the measuring temperature of 25° C. $V_I(t=10,000')$ is the specific volume at the time $t = 10,000$ minutes after the sample has been quenched.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLES

The drawing shows graphical relationship of time and the modification conversion, as determined by dilatometry. The polybutene-1 employed in the examples described hereinafter is produced in accordance with the low-pressure method of Ziegler-Natta. It exhibits a degree of crystallinity of 0.40, and a reduced specific viscosity of 4.8 dl./g., determined at a concentration of 0.1 g./dl. in "Decalin" at 135° C. The polypropylene exhibits a degree of crystallinity of 0.6 and a reduced specific viscosity of 4.26 dl/g, determined at a concentration of 0.1 g/dl in "Decalin" at 135° C. The melting region is 158° – 164° C.

The polybutene-1 compositions whose modification conversions were measured were the following:

1. Polybutene-1 sample without additives (comparative example);
2. Polybutene-1 containing 5 percent by weight of butyl stearate as additive (state of the art);
3. Polybutene-1 containing 10 percent by weight of polypropylene as additive (state of the art); and
4. Polybutene-1 of this invention containing a mixture of 10% be weight of polypropylene and 5 percent by weight of butyl stearate.

The modification conversion rate increase attained by the synergistic combination of polypropylene and butyl stearate is clearly apparent.

The same is true for the compositions of Examples 2–9 of Table 1 and of Examples 10 and 11 of Table 2, which clearly demonstrate the synergistic effect of the additives employed in this invention. Table 1 lists compounds having a synergistic accelerating effect in combination with polypropylene and which to a lesser extent accelerate the modification conversion in the absence of polypropylene. Table 2 sets forth compounds which by themselves either do not have an accelerating effect or which have a decelerating influence on the modification conversion, but which produce a strong synergistic accelerating effect in combination with polypropylene.

TABLE 1

II I Modification Rates of Polybutene-1 Compositions

| Example | Additive % by Weight | Half-Time Value Minutes |
|---|---|---|
| 1 | None | 2900 |
| 2 | 5% Butyl stearate | 790 |
|   | 30% Polypropylene |  |
|   | 10% Butyl stearate + |  |
|   | 30% Polypropylene | 200 |
| 3 | 30% Butyl stearate | 250 |
|   | 10% Polypropylene | 910 |
|   | 30% Butyl stearate + |  |
|   | 10% Polypropylene | 130 |
| 4 | 5% Hydroxyethyl stearate | 2600 |
|   | 10% Polypropylene | 910 |
|   | 5% Hydroxyethyl stearate + |  |
|   | 10% Polypropylene | 790 |
| 5 | 5% n-Decyl stearate | 1100 |
|   | 10% Polypropylene | 910 |
|   | 5% n-Decyl stearate + |  |
|   | 10% Polypropylene | 670 |
| 6 | 10% Vinyl stearate | 520 |
|   | 10% Polypropylene | 910 |
|   | 10% Vinyl stearate + |  |
|   | 10% Polypropylene | 245 |
| 7 | 10% Di(2-ethylhexyl) adipate | 1070 |
|   | 50% Polypropylene | 1320 |
|   | 10% Di(2-ethylhexyl) adipate + |  |
|   | 50% Polypropylene | 300 |
| 8 | 10% Chloroparaffin | 1650 |
|   | 50% Polypropylene | 1320 |
|   | 10% Chloroparaffin + |  |
|   | 50% Polypropylene | 470 |
| 9 | 10% Deconol phthalate | 2250 |
|   | 50% Polypropylene | 1320 |
|   | 10% Decanol phthalate + |  |
|   | 50% Polypropylene | 680 |

TABLE 2

II I Modification Rates of Polybutene-1 Compositions

| Example | Additive % by Weight | Half-time Value Minutes |
|---|---|---|
| 10 | 10% Di(3-5-5-trimethylhexyl)-phthalate | 3100 |
|    | 50% Polypropylene | 1320 |
|    | 10% Di(3-5-5-trimethylhexyl)-phthalate + |  |
|    | 50% Polypropylene | 780 |
| 11 | 10% Tridecanol phthalate | 3050 |
|    | 50% Polypropylene | 1320 |
|    | 10% Tridecanol phthalate + |  |
|    | 50% Polypropylene | 780 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Thermoplastic polybutene-1 molding compositions having improved conversion rates from modification II to modification I containing up to about 70 percent by weight of a mixture of 0.1 to 70 percent by weight of a thermoplastic solid polypropylene and an amount between 0.1 to 50 percent by weight, based on the polybutene-1, effective to decrease substantially the modification II to modification I conversion rate of the polybutene-polypropylene mixture, of an ester of stearic acid of a molecular weight substantially lower than the polypropylene.

2. A polybutene-1 composition according to claim 1 containing about 0.1 to 20 percent by weight of solid polypropylene.

3. A polybutene-1 composition according to claim 1 containing about 1 to 10 percent by weight of an ester of stearic acid.

4. A polybutene-1 composition according to claim 4 wherein the ester is selected from the group consisting of butyl stearate, hydroxyethyl stearate, n-decyl stearate and vinyl stearate.

5. A polybutene-1 composition according to claim 4 wherein the ester is butyl stearate.

6. A process for increasing the conversion rate of polybutene-1 from modification II to modification I which comprises incorporating therein, prior to thermoplastic processing, up to about 70 percent by weight of a mixture of 0.1 to 70 percent by weight of a thermoplastic solid polypropylene and an amount between 0.1 to 50 percent by weight, based on the polybutene-1, effective to decrease substantially the modification II to modification I conversion rate of the polybutene-polypropylene mixture, of an ester of stearic acid of a molecular weight substantially lower than the polypropylene.

7. A process according to claim 6 wherein about 0.1 to 20 percent by weight of solid polypropylene is incorporated in the polybutene-1.

8. A process according to claim 6 wherein about 1 to 10 percent by weight of an ester of stearic acid is incorporated in the polybutene-1.

9. A process according to claim 8 wherein the ester is selected from the group consisting of butyl stearate, hydroxyethyl stearate, n-decyl stearate and vinyl stearate.

10. A process according to claim 9 wherein the ester is butyl stearate.

* * * * *